United States Patent Office 2,737,499
Patented Mar. 6, 1956

2,737,499
ORGANIC-HF EMULSIONS

Willard T. Grubb, Jr., Schenectady, N. Y., assignor to General Electric Company, a corporation of New York No Drawing. Application April 28, 1953,
Serial No. 351,741

11 Claims. (Cl. 252—309)

This invention is concerned with new and useful stable emulsions of anhydrous hydrogen fluoride and liquid organic compounds. More particularly the invention relates to liquid systems of the type comprising anhydrous hydrogen fluoride, a liquid organic compound having limited miscibility with anhydrous hydrogen fluoride and a dispersing or emulsifying agent, having from 12 to 22 carbon atoms in either a straight or branched chain configuration, selected from the class consisting of aliphatic monohydric alcohols (including halogenated, e. g. chlorinated alcohols), aromatic hydroxy compounds, aliphatic carboxylic acids (including halogenated, e. g. chlorinated acids), aliphatic amines, aliphatic nitriles, aliphatic nitro substituted compounds, aliphatic ketones and aliphatic ethers.

Heretofore prior investigators have experienced difficulties in utilizing anhydrous HF per se in various applications, for instance, in fluorinating organic compounds, in dispersing HF in organic systems as a catalyst for other reactions, for example, in alkylation, isomerization and polymerization of hydrocarbons, etc. In most instances, the inability of anhydrous HF to react readily with a large number of some compounds, or to aid as a catalyst for many reactions, has been found due to the limited miscibility of anhydrous HF with large classes of organic liquids.

Anhydrous HF is physically similar to water and, accordingly, forms two phase systems with non-polar organic liquids. It is an object of the present invention to overcome past difficulties directly resulting from the formation of such two phase systems by preparing new and useful emulsions of organic liquids in anhydrous HF or in some cases emulsions of anhydrous HF in organic liquids. These emulsions are readily suitable for any of the purposes enumerated above without the previously encountered difficulties.

I have now unexpectedly discovered that for the first time it is possible to prepare stable emulsions of organic liquids in anhydrous HF and vice versa, using as the dispersing agent relatively inexpensive materials. More particularly, I have found that extensive emulsification of the aforedescribed two phase systems, anhydrous HF and a liquid organic compound, is produced by the addition of an organic dispersing or emulsifying agent containing 12 to 22 carbons in either a branched or straight chain configuration selected from the class consisting of aliphatic monohydric alcohols, aromatic hydroxy compounds, aliphatic carboxylic acids, aliphatic amines, aliphatic nitriles, aliphatic nitro compounds, aliphatic ketones and aliphatic ethers, and any of the foregoing class containing an alkyl or aryl substituent. Any of the known methods of forming an emulsion, for example, shaking, stirring, etc., may be employed.

Suspensions or emulsions made in accordance with my above-described methods are uniformly stable over relatively long periods of time. In addition, even if there should be some slight settling out of the suspended component, it is possible by slight agitation of some type, either prior to use or during use, to reinstate the emulsion to its originally acceptable form.

In using the various members of the class of emulsifying agents mentioned above, it will be apparent to those skilled in the art that the quantity of dispersing or emulsifying agent employed may be varied within certain limits and is dependent in part upon the liquid organic compound undergoing emulsification. In most cases, the quantity of such agent can be varied from about 1 to 10 percent, by weight, of the liquid organic compound. A preferred range is from about 1–2 percent, by weight, of the liquid organic compound.

Among the $C_{12}$ to $C_{22}$ aliphatic monohydric alcohols which may be employed as emulsifying agents in the practice of this invention may be mentioned, for example, tetradecanol, hexadecanol, octadecanol and docosamol, both straight and branched chain and their halogenated derivatives. Other hydroxy compounds include aromatic ring hydroxy substituted compounds, for instance, beta naphthol.

Among the various $C_{12}$ to $C_{22}$ aliphatic acids which may be used in my invention as emulsifying agents may be mentioned dodecanoic, tetradecanoic, hexadecanoic and octadecanoic, both straight and branched chain and their halogenated derivatives.

Various aliphatic amines having 12 to 22 carbons in either a straight or branched chain which also may be employed as emulsifying agents include, for instance, dodecyl amine, tetradecyl amine, octadecyl amine, etc.

Included among the aliphatic nitriles which may be employed as emulsifying agents are, for instance, dodecyl, tetradecyl, hexadecyl, octadecyl, etc., nitriles.

Various nitro compounds which may also be employed as emulsifying agents include $C_{12}$ to $C_{22}$ aliphatic nitrated hydrocarbons, for instance, mononitrated derivatives of dodecane, tridecane, tetrodecane, pentadecane, etc.

Included among the long chain aliphatic ketones useful as emulsifying agents in the process of my invention are, for instance, the methyl $C_{17}$, methyl $C_{18}$, methyl $C_{19}$, and methyl $C_{21}$, ketones and their propyl, butyl, etc. homologues.

In the practice of my invention, the class of organic liquids which may be emulsified with anhydrous hydrogen fluoride consists of all organic liquids which are not ordinarily miscible with anhydrous HF and which meet the following conditions: (1) are liquid, (2) are substantially inert to anhydrous HF, and (3) are substantially immiscible with anhydrous HF.

Illustrative examples of organic compounds which may be emulsified in accordance with my above-described methods include the liquid aliphatic hydrocarbons, for instance, heptane, octane, dodecane, mixed hydrocarbons as present in kerosene, etc., chlorinated derivatives of the aforementioned hydrocarbons; cyclic hydrocarbons, for instance, cyclopentane, cyclohexane, cycloheptane, cyclooctane, etc.; aromatic hydrocarbons such as benzene and its methyl, ethyl, propyl, etc. alkylated derivatives; halogenated aromatics, for instance, benzotrifluoride, etc.

A range of proportions of anhydrous HF, emulsifying agent and organic liquid compound which have been found suitable in the practice of my invention is disclosed in the table below, wherein are found both representative broad ranges of ingredients and preferred ranges which have been found to be eminently suitable.

TABLE I

|  | Broad Range, Percent By Weight | Preferred Range, Percent By Weight |
|---|---|---|
| Anhydrous HF | 1-98 | 49.0-49.5 |
| Emulsifying Agent | 1-10 | 1-2 |
| Organic Compound | 1-98 | 49.0-49.5 |

The foregoing percents of ingredients are intended to add up to 100%.

In order that those skilled in art art may better understand how the present invention may be practiced, the following examples are given by way of illustration and not by way of limitation. All parts and percentages are by weight.

*Example*

An emulsion of anhydrous HF and benzene was prepared using n-octadecanol as the emulsifying agent. 0.2 parts of n-octadecanol were dissolved in 8.8 parts of benzene and this solution shaken with approximately 25 parts of substantially anhydrous HF. A heavy emulsion was formed. After standing it was noted that the phase, HF suspended in benzene, had settled out after 15 minutes, but a lower layer consisting of benzene suspended in HF was permanent for 30 minutes or more without further agitation. After longer standing periods, mere stirring was sufficient to reinstate the emulsion to its originally acceptable form.

In each of the instances tabulated in Table II below, equal proportions of the organic liquid to be emulsified and anhydrous HF were shaken with from 1 to 10 percent, by weight, of emulsifying agent. The success of each emulsion was judged visually by comparison with the emulsion produced in the above example and rated good if equal to or superior to this, and fair or poor in the order of decreasing stability of the emulsion.

An important advantage in using the emulsions prepared in accordance with my invention is the ease with which they can be broken. Thus, any of the organic-HF emulsions heretofore described can be broken by adding a small amount of water or a small amount of a hydrogen fluoride soluble inorganic salt. For example, I have found any alkali metal fluoride suitable as an emulsion breaker.

What I claim as new and desire to secure by Letters Patent of the United States is:

1. An organic emulsion composed of (1) substantially anhydrous hydrogen fluoride, (2) a liquid organic compound substantially immiscible with anhydrous hydrogen fluoride selected from the group consisting of aliphatic hydrocarbons, alicyclic hydrocarbons, aromatic hydrocarbons, alkyl aromatic hydrocarbons, chlorinated hydrocarbons and fluorinated hydrocarbons, and (3) a quantity of an organic emulsifying agent containing from 12 to 22 carbon atoms selected from the group consisting of alkyl and aryl substituted aliphatic monohydric alcohols, aliphatic carboxylic acids, aliphatic amines, aliphatic nitriles, aliphatic nitro compounds, aliphatic ketones and aliphatic ethers sufficient to produce a suspension of (1) in (2).

2. An organic emulsion composed of equal parts, by weight, of (1) substantially anhydrous hydrogen fluoride, (2) a liquid organic compound substantially immiscible with anhydrous hydrogen fluoride selected from the group consisting of aliphatic hydrocarbons, alicyclic hydrocarbons, aromatic hydrocarbons, alkyl aromatic hydrocarbons, chlorinated hydrocarbons and fluorinated hydrocarbons, and (3) 1 to 2 percent, by weight of (2), of an organic emulsifying agent containing from 12 to 22 carbon atoms selected from the group consisting of alkyl and aryl substituted aliphatic monohydric alcohols, aliphatic carboxylic acids, aliphatic amines, aliphatic nitriles, aliphatic nitro compounds, aliphatic ketones and aliphatic ethers effective to produce a suspension of (1) in (2).

3. An emulsion having the composition of claim 1 in which the dispersing agent is n-octadecanol.

4. An emulsion having the composition of claim 1 in which the dispersing agent is n-octadecanoic acid.

5. An emulsion having the composition of claim 1 in

TABLE II
EMULSIFYING AGENT

| Organic Liquid | $CH_3(CH_2)_{16}CH_2OH$ | $CH_3(CH_2)_{16}COOH$ | $CH_3(CH_2)_{16}CH_2NH_2$ | $CH_3(CH_2)_{16}C\equiv N$ |
|---|---|---|---|---|
| Carbon tetra chloride | G | G | G | F |
| n-hexane | F | G | F | F |
| Cyclohexane | G* | G* | G* | G |
| Benzene | G | F | F | P |
| Trichloro ethylene | F | G | G | P |
| Benzotrifluoride | F | F | P | F |
| Toluene | G | P | P | F |
| 1,2-Dichloroethane | F | F | P | F |

G = Good; F = Fair; P = Poor.

*In these emulsions, HF suspended in the organic phase was more stable.

With the exception of the aforementioned HF suspensions in organic phase, the organic suspended in the HF phase was more stable.

The HF emulsions described above can be employed in various ways. They can be used, for instance, for promoting reaction between the HF and the organic liquid dissolved therein merely by filling a bomb with the desired emulsion and applying heat. They can easily be used to disperse HF in organic systems as a catalyst, for instance, in hydrocarbon polymerization, alkylation, and isomerization reactions. They further find utility as mechanical aids in preventing the settling out of various ratios of liquid HF plus organic liquid through piping, etc., in large scale operations involving such materials.

which the dispersing agent is n-octadecyl amine.

6. An emulsion having the composition of claim 1 in which the dispersing agent is n-octadecyl nitrile.

7. An emulsion having the composition of claim 1 in which the organic compound is benzene and the dispersing agent is beta naphthol.

8. An emulsion having the composition of claim 1 comprising 1 to 98 per cent by weight of (1), 1 to 98 per cent by weight of (2) and 1 to 10 per cent by weight of (3).

9. An emulsion having the composition of claim 1 comprising a suspension of 1 to 98 per cent by weight of (2) in 1 to 98 per cent by weight of (1), and 1 to 10 per cent by weight of (3).

10. An emulsion having the composition of claim 1 comprising equal parts by weight of (1) and (2) containing a dispersed phase comprising globules of (2), a dispersing medium of (1), and a quantity of (3) sufficient to produce a suspension of (2) in said dispersion medium (1).

11. An emulsion having the composition of claim 1 comprising equal parts by weight of (1) and (2) containing a dispersed phase of (1) in a dispersing medium of (2) and a quantity of (3) sufficient to produce a suspension of said dispersed phase (1) in said dispersing medium (2).

References Cited in the file of this patent

UNITED STATES PATENTS 2,529,010  Friedman _____ Nov. 7, 1950